United States Patent [19]

Heiz

[11] Patent Number: 4,478,329
[45] Date of Patent: Oct. 23, 1984

[54] TRANSFER APPARATUS FOR PALLETS AND SIMILAR PIECE GOODS

[75] Inventor: Ulrich Heiz, Säriswil, Switzerland

[73] Assignee: Inventio AG, Hergiswil, Switzerland

[21] Appl. No.: 368,911

[22] Filed: Apr. 16, 1982

[30] Foreign Application Priority Data

May 5, 1981 [CH] Switzerland ............... 2901/81

[51] Int. Cl.$^3$ ............... B65G 37/00; B65G 21/10
[52] U.S. Cl. ............... 198/574; 198/631; 198/586
[58] Field of Search ............ 198/574, 583, 586, 369, 198/631, 371, 345; 414/390, 398, 401, 278

[56] References Cited

U.S. PATENT DOCUMENTS

| | | | |
|---|---|---|---|
| 859,595 | 7/1907 | Camp | 198/371 |
| 3,729,083 | 4/1973 | Wollenhaupt et al. | 198/586 |
| 4,014,428 | 3/1977 | Ossbahr | 414/278 |
| 4,349,097 | 9/1982 | Curti | 198/631 |

FOREIGN PATENT DOCUMENTS

| | | | |
|---|---|---|---|
| 2032295 | 1/1972 | Fed. Rep. of Germany | |
| 49576 | 4/1977 | Japan | 414/278 |
| 135354 | 10/1981 | Japan | 414/390 |

*Primary Examiner*—Joseph E. Valenza
*Assistant Examiner*—Daniel R. Alexander
*Attorney, Agent, or Firm*—Werner W. Kleeman

[57] ABSTRACT

A transfer apparatus wherein the conveyed loads, which need not absolutely possess a square or rectangular cross-sectional area or configuration, are received by or delivered from a transport vehicle, without the load itself having to experience a tilting movement, when it departs, for instance, from a stationary chain conveyor and is taken-over by the chain conveyor of a displacement carriage. The gap between the stationary chain conveyor and the chain conveyor mounted upon the transport vehicle is bridged by the laterally movable displacement carriage. The related chain drive serves for moving the conveyor chains of the chain conveyor and the displacement carriage. An alternately effective brake-locking device controls both movements. With blocked conveyor chains the displacement carriage, depending upon the direction of rotation of the drive motor of the chain drive, moves laterally in one or the other direction until reaching a related lateral stop or impact member. With released conveyor chains and blocked displacement carriage the conveyor chains of the chain conveyor are displaced until the conveyed load can be transferred or received, as the case may be.

3 Claims, 3 Drawing Figures

TRANSFER APPARATUS FOR PALLETS AND SIMILAR PIECE GOODS

BACKGROUND OF THE INVENTION

The present invention broadly relates to material handling equipment and, more specifically, concerns a new and improved construction of a transfer apparatus for loads, especially pallets and similar piece goods.

Generally speaking, the transfer apparatus of the present development serves for the transfer of loads, especially pallets and similar piece goods, between a stationary chain conveyor and a conveyor device equipped with, in particular, a conveyor track extending at right angles or perpendicular to the conveying direction of the stationary chain conveyor, and the load transfer is accomplished by means of a rail-bound displacement carriage which can travel to a limited degree upon its support.

Such type of transfer apparatuses serve to transfer conveyed loads from one conveyor track to another conveyor track arranged essentially at right angles or perpendicular to the first mentioned conveyor track. Generally, there are employed for this purpose stationary short conveyor tracks having rail or track-bound displacement devices in the form of overhung and elevationally displaceable support forks, or in the form of displacement lift carriages. The conveyed loads are lifted from one conveyor track, transported to another conveyor track and, at that location, again deposited upon such other conveyor track.

With a pallet transfer station of the type disclosed in German patent publication No. 2,419,943, there is used as the transfer element one such rail or track-bound and elevationally displaceable support fork which can be introduced beneath the pallet, lifted-off of a stationary chain conveyor, displaced in its rails or track, and then again deposited upon a second chain conveyor arranged essentially at right angles to the first chain conveyor.

A second construction of similar type of transfer station has been disclosed in German Pat. No. 2,032,295. Here, there is used as the transfer element a rail-bound displacement lift carriage which travels beneath the conveyed load and lifts such out of a roller conveyor track, so that following a brief horizontal travel of the load upon the displacement lift carriage such load can be again deposited upon a chain conveyor arranged at right angles to the roll or roller conveyor track.

Both of these state-of-the-art load transfer apparatuses require complicated lift devices in order to lift the conveyed load off of one conveyor track and to again deposit such upon the other conveyor track. Additionally, each conveyor track, which terminates at right angles with respect to the other conveyor track, requires its own transfer station. Both of the aforementioned drawbacks become that much more prevalent if there are provided a great number of transfer stations or locations within a conveyor installation. An additional drawback with the prior art installations resides in the fact that, during each transfer operation there must be accepted standstill times, since the conveyed loads only can be transferred when they are stationary.

SUMMARY OF THE INVENTION

Therefore, with the foregoing in mind it is a primary object of the present invention to provide a new and improved construction of a load transfer apparatus which is not associated with the aforementioned drawbacks and limitations of the prior art constructions.

Another and more specific object of the present invention aims at the provision of a new and improved construction of load transfer apparatus which does not require any complicated lift device as the transfer element and does not need a conveyor element which must travel directly beneath the conveyed or transported load.

Yet a further significant object of the present invention is directed to a new and improved construction of transfer apparatus of the previously mentioned type wherein it is possible to receive the conveyed load without any standstill time, in other words with as little time loss as possible, from the stationary conveyors, or to transfer such load to such stationary conveyors.

Still a further significant object of the present invention is directed to a new and improved construction of a load transfer apparatus which enables transferring or receiving, apart from pallets, also conveyed or transported loads which do not possess any essentially square or rectangular support surface, particularly, for instance, for handling loads having circular support or contact surfaces, such as vats or barrels, without the need that the conveyed load must perform a tilting movement.

Now in order to implement these and still further objects of the invention, which will become more readily apparent as the description proceeds the load transfer apparatus of the present development is manifested by the features that the rail-bound displacement carriage is displaceably arranged upon a transport vehicle of the conveyor device, and a conveyor element of the displacement carriage can be displaced approximately at the same conveying plane as the chains of the stationary chain conveyor between neighboring conveyor chains of such stationary chain conveyor.

The invention affords an appreciable number of significant advantages, some of which will be discussed in particular at this point of the disclosure. One of the notable advantages of the system design resides in the fact that there is not required for each transfer station its own transfer apparatus. The transfer apparatus arranged upon a transport vehicle enables servicing a number of load transfer stations or locations. Since the number of transfer stations usually is greater than the number of required transport vehicles, there is realized an advantageous reduction in the number of transfer apparatuses.

If for some reason an element or component of the transfer apparatus becomes inoperative, then the operation of the system can be continued simply by using the next following transport vehicle, whereas with the state-of-the-art stationary transfer apparatuses it was necessary to shutdown the related line of the transport apparatus until the defective element could be repaired or exchanged.

A further advantage of the load transfer apparatus of the invention resides in the fact that it is possible to accomplish with only a single drive unit, with the aid of the alternatingly effective brake-blocking device, all movement functions of the transfer apparatus, the movements of the conveyor chains of the chain conveyor of the displacement carriage and also the movement of the displacement carriage itself.

Due to the so-to-speak "in-flight" transfer or reception of the conveyed load from the chain conveyor which is arranged upon the displacement carriage and the stationary chain conveyor, or vice-versa, there is realized in addition to the already explained advantages a saving in time at the transfer stations.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
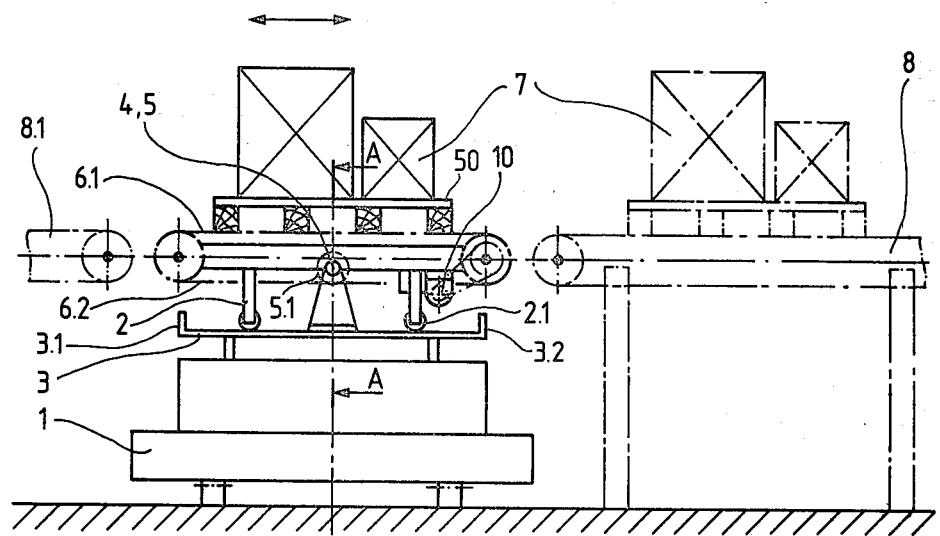
FIG. 1 is an elevational view of a transport vehicle, viewing the same in its transport direction, and which contains a superstructure in the form of a rail or trackbound displacement carriage equipped with a conveyor device, here in the form of a chain conveyor.

Describing now the drawings, it is to be understood that only enough of the construction of the product handling installation has been depicted in the drawings to enable those skilled in the art to readily understand the underlying principles and concepts of the present development, while simplifying the illustration of the drawings.

Figure 2:
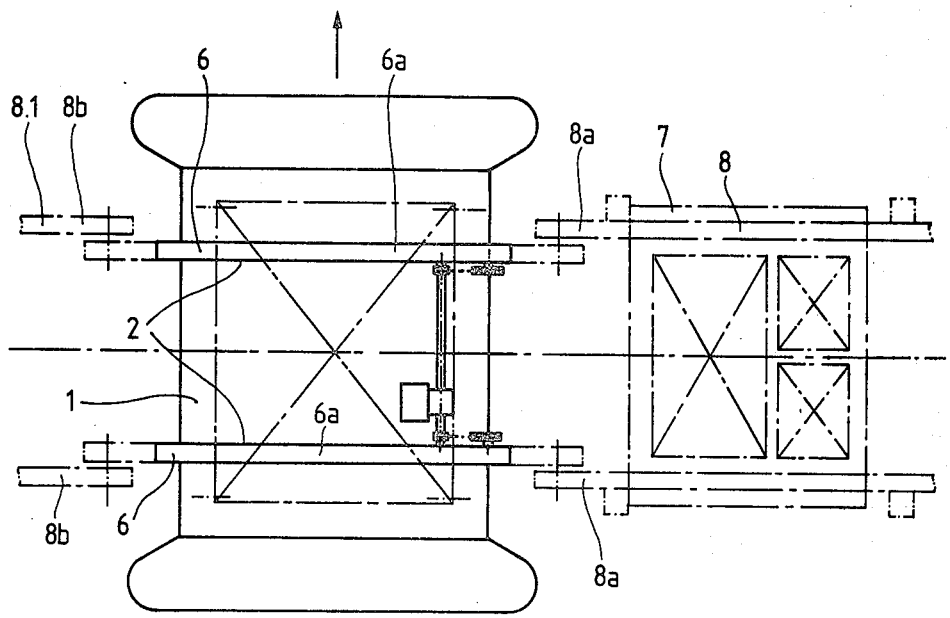
FIG. 2 is a top plan view of the arrangement of FIG. 1.

Turning attention now specifically to FIGS. 1 and 2, reference numeral 1 designates a transport vehicle. Arranged upon a displacement carriage guide or guide means 3, mounted as a superstructure upon the transport vehicle 1, is a displacement carriage 2 or equivalent structure. This displacement carriage 2 is provided with travel rolls 2.1 so that it can be laterally shifted upon the displacement carriage guide or guide means 3 constituting a track or rail arrangement for such displacement carriage 2. This displacement carriage 2 is secured in its lateral movements towards the left and right of the showing of FIG. 1 at the end or terminal positions of the displacement carriage guide 3 by appropriate stop or impact members 3.1 and 3.2. Arranged upon the displacement carriage 2 is a suitable conveyor device, here shown in the form of a chain conveyor 6. The conveyor chains 6a of the chain conveyor 6 are appropriately driven by a suitable chain drive 10. The endless conveyor chains 6a of the chain conveyor 6 each comprise an upper chain run 6.1 and a lower chain run 6.2. The upper chain run 6.1 is supported throughout its entire chain run length by a runner or guide element 2.2 of the displacement carriage 2 and supports a conveyed or transported load 7 reposing, for instance, upon a related pallet 50. For the transport from transfer station to transfer station the conveyor chains 6a and the displacement carriage 2 are secured and locked in their intermediate position by any suitable movable stops or impact members or equivalent structure.

A brake-blocking device 4, 5 is connected by means of a sprocket wheel or gear 5.1 with the lower chain run 6.2. At the transfer locations or stations the conveyed load 7 is transferred from the chain conveyor 6 of the displacement carriage 2 to a stationary chain conveyor 8 or 8.1, as the case may be.

Figure 3:
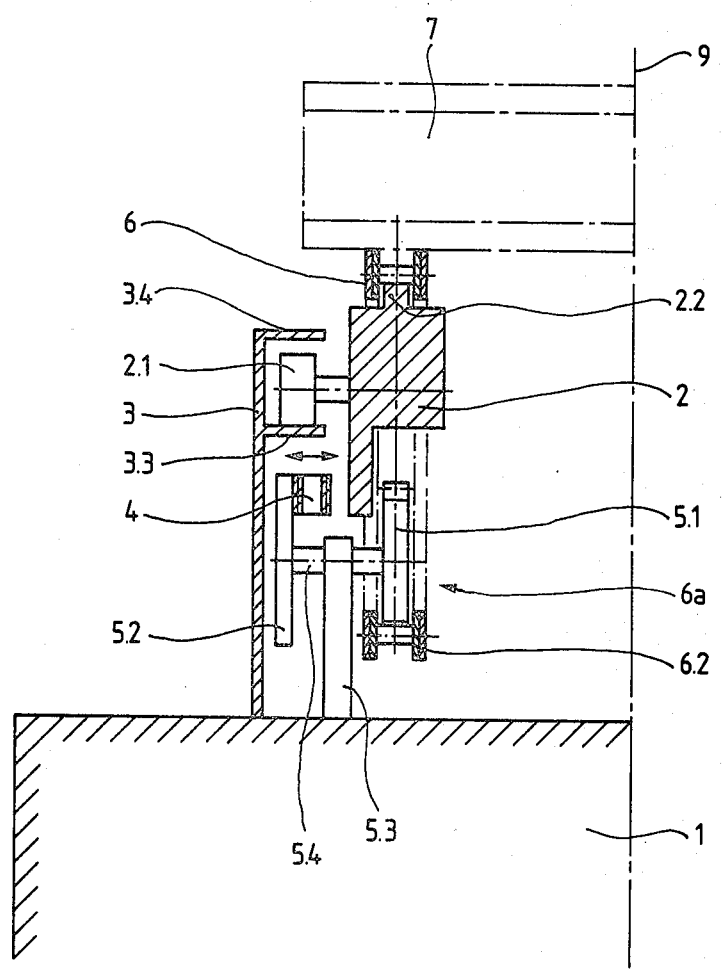
FIG. 3 is an enlarged sectional view of the arrangement of FIG. 1, through a brake-blocking device and taken substantially along the line A—A thereof.

FIG. 3 illustrates in an enlarged sectional view, the section being taken substantially along the section line A—A of the arrangement of FIG. 1, details of the brake-blocking device 4, 5. To simplify the illustration only one-half of the symmetric displacement carriage 2 has been illustrated and the other half of such displacement carriage 2, appearing to the right of the symmetrical axis 9, has not been shown in the drawing, but its structure is the same as that described for the left-hand portion of the illustration of FIG. 3. At the upper portion of the transport vehicle 1 there is fixedly arranged the displacement carriage guide or guide means 3. At the lower portion 3.3 of the displacement carriage guide means 3 there are supported the travel rolls 2.1 of the displacement carriage 2. This displacement carriage 2 is laterally travelable or shiftable in both directions within the displacement carriage guide means 3 and can be secured at both terminal positions by the stop or impact members 3.1 and 3.2 or equivalent structure. An upper counter guide or rail 3.4 prevents tilting of the displacement carriage 2 during loading and unloading of the transport or conveyed load 7. The upper run 6.1 of the endless transport chains 6a of the chain conveyor 6 is slidingly supported by the related runner 2.2 of the displacement carriage 2. The transport chains 6a of the chain conveyor 6 receive the conveyed load 7 from the stationary chain conveyor 8 or equivalent conveyor device, carries such load during the transport thereof and again deposits such transferred load to an allocated transfer location. Engaging with the lower run 6.2 of the depicted conveyor or transport chain 6a is the sprocket wheel or gear 5.1 of the brake-blocking device 4, 5. A common shaft 5.4 of the sprocket gear 5.1 and a brake disc 5.2 is rotatably mounted in a bearing block 5.3 which is fixedly connected with the transport vehicle 1. Between the displacement carriage 2 and the brake disc 5.2 there is arranged a brake device 4 which alternately can either brake and block, by means of the brake disc 5.2 and the sprocket gear 5.1, the conveyor or transport chains 6a of the chain conveyor 6 or the displacement carriage 2.

Having now had the benefit of the foregoing description of a preferred construction of transfer apparatus for loads, such as pallets and similar piece goods, its mode of operation will be described and is as follows:

The transport vehicle 1 travels, for instance, while supporting the conveyed load 7 carried by the pallet 50, between the transfer station or location which consists of two stationary conveyor devices, here in the form of chain conveyors 8 and 8.1. Both of the stationary chain conveyors are located opposite one another and the spacing therebetween is just large enough in order to accommodate the transport vehicle 1 with the thereat mounted displacement carriage 2, sufficient play being provided between the two stationary chain conveyors 8 and 8.1 so that the transport vehicle 1 can travel therebetween and still have sufficient play at both sides. Once the transport vehicle 1 has attained the proper position between the stationary chain conveyors 8 and 8.1. this transport vehicle 1 is braked and remains stationary. A drive motor of the chain drive arranged upon the displacement carriage 2, and now with the conveyor chains 6a blocked, displaces the displacement carriage 2 together with the conveyed load 7 between the neighboring conveyor chains 8a of the designated stationary receiving chain conveyor 8, as best seen by referring to FIG. 2, in order to close or bridge the gap or space between the chain conveyor 6 of the displacement carriage 2 and the stationary chain conveyor 8. Shortly before there has been reached the position of the lateral stop or impact member 3.2 the conveyor chains 6a of the chain conveyor 6 are released, i.e. placed into their transport operational mode, and the displacement carriage 2 is braked and blocked in position. Since the drive motor of the chain drive 10 does not interrupt its operation the conveyor chains 6a of the chain conveyor 6 along with the conveyed or transported load 7 reposing thereon are moved in the same direction until the transport posing thereon are moved in the same direction until the transport load 7 and the supporting pallet 50 have been taken-over by the stationary chain conveyor 8. The transition between the displacement carriage movement and the conveyor chain movement, or vice versa, is not effective at the transport load 7. The transport or conveyed load 7 moves over the entire transfer path, without interruption, with the same constant velocity and in the same direction. By virtue of bridging the transfer gap between the stationary chain conveyor 8 and the chain conveyor 6 arranged upon the displacement carriage 2 it is possible to transport conveyed or transported loads having, for instance, circular support or contact surfaces, i.e. contact surfaces differing from a square or rectangular cross-sectional configuration, without the conveyed load 7 having to perform tilting movements during the transfer operation or during the load receiving or take-over operation.

If the transport vehicle 1 is intended to be displaced to a different transfer location for further transporting loads thereat, then the further travel of such transport vehicle 1 is initiated immediately after the displacement carriage 2 has again reached its intermediate position at the displacement carriage guide 3 and has been blocked thereat, this intermediate position having been accomplished by directly initiating the return movement of the displacement carriage 2 towards the center of the displacement carriage guide 3.

If the transport vehicle 1 is intended to receive a new transport or conveyed load, then the displacement carriage 2, without interruption, travels to the other side of the transport vehicle 1 in order to receive a new conveyed load, for instance from the oppositely situated stationary chain conveyor 8.1 The drive motor of the chain drive 10 upon the displacement carriage 2, for this purpose rotates in the opposite direction and, with the conveyor chains 6a of the chain conveyor 6 blocked, moves the displacement carriage 2 until reaching the stop or impact member 3.1 to the other oppositely situated side of the displacement carriage guide 3. The displacement carriage 2 thus travels between the neighboring conveyor chains 8b of the oppositely situated, stationary transfer chain conveyor 8.1, and at that location of the transport installation thus bridges the gap between these two now coacting units. Once the displacement carriage 2 has reached the region of the stop or impact member 3.1 there are again released the conveyor chains 6a of the chain conveyor 6 and the displacement carriage 2 is braked and blocked. The direction of rotation of the chain drive 10 is now changed, so that there can be received the transport or conveyed load 7 moved from the stationary transfer-chain conveyor 8.1 in the direction of the transport vehicle 1. If the transport load 7 is located approximately at the center of the displacement carriage 2 then there is released the blocking of the displacement carriage 2 and there are blocked the conveyor chains 6a of the chain conveyor 6 of such displacement carriage 2. The conveyed or transport load 7 is now moved, without any change in velocity, in conjunction with the displacement carriage 2 until reaching the predestined or marked intermediate position of the transport vehicle 1. In this position there is also blocked the displacement carriage 2 and the transport vehicle 1 is ready for further travel.

The brake-blocking device can be designed, for instance, as an electromagnetic brake-blocking unit wherein, for instance, in the currentless condition there is established a blocking connection between the transport vehicle 1 and the displacement carriage 2, and for the operation the brake-blocking device 4, 5 can be electromagnetically vented.

It is possible to undertake different changes and to devise various modified constructional embodiments, within the teachings and framework of the present invention and without departing from the underlying principles and concepts. Thus, for instance, instead of using a chain conveyor there could be arranged, for example, also a belt conveyor upon the displacement carriage of the transport vehicle. The transport vehicle, instead of being constituted by a rail-free vehicle, also could be designed so as to constitute a rail-bound vehicle, a suspension track vehicle, or the cabin of a lift. Equally, there could be used instead of a common chain drive for the conveyor chains of the chain conveyor of the displacement carriage and the displacement carriage itself, a respective individual, independently operative drive.

While there are shown and described present preferred embodiments of the invention, it is to be distinctly understood that the invention is not limited thereto, but may be otherwise variously embodied and practiced within the scope of the following claims. Accordingly,

What I claim is:

1. In a transfer apparatus for loads, especially pallets and similar piece goods, between a stationary chain conveyor and a conveyor device having a conveyor track extending perpendicular to the direction of conveyance of said stationary chain conveyor, wherein the load transfer is accomplished by means of a rail-bound displacement carriage which can be moved within a predetermined limited extent upon its support, the improvement which comprises:

said conveyor device including a transport vehicle;

said rail-bound displacement carriage being arranged to be displaceable upon said transport vehicle of said conveyor device;

said displacement carriage having a conveyor element arranged to be movable at approximately the same conveying plane as chains of said stationary chain conveyor and between neighboring conveyor chains of said stationary chain conveyor;

said conveyor element of said displacement carriage comprises a chain conveyor;

chain drive means arranged upon said displacement carriage;

said chain drive means driving conveyor chains of said chain conveyor of said displacement carriage; and a brake-blocking device arranged upon said transport vehicle; and said brake-blocking device selectively alternately establishing a rigid blocking connection between said transport vehicle and said displacement carriage and between said transport vehicle and said conveyor chains of said chain conveyor, respectively.

2. The improvement as defined in claim 1, wherein:
   said displacement carriage is arranged to be displaceable transversely with respect to said conveying track of said conveyor device.
3. The improvement as defined in claim 1, wherein: said brake-blocking device comprises an electromagnetically operated brake-blocking unit which, in a currentless state thereof, establishes a blocking connection between said transport vehicle and said displacement carriage, and said brake-blocking device being electro-magnetically ventable for operation thereof.

* * * * *

UNITED STATES PATENT AND TRADEMARK OFFICE
CERTIFICATE OF CORRECTION

PATENT NO. : 4,478,329
DATED : October 23, 1984
INVENTOR(S) : ULRICH HEIZ

It is certified that error appears in the above—identified patent and that said Letters Patent is hereby corrected as shown below:

Column 5, line 8, delete "until the transport posing thereon are moved"

Column 5, line 9, delete "in the same direction"

Signed and Sealed this

Sixteenth Day of April 1985

[SEAL]

Attest:

DONALD J. QUIGG

Attesting Officer     Acting Commissioner of Patents and Trademarks